United States Patent
Ghiasvand et al.

(10) Patent No.: US 10,258,963 B2
(45) Date of Patent: Apr. 16, 2019

(54) EXTRACTION AND DETERMINATION OF RESIDUAL ORGANIC SOLVENTS IN PHARMACEUTICAL PRODUCTS BY SPME METHOD USING A NEW NANOCOMPOSITE FIBER

(71) Applicants: Alireza Ghiasvand, Khorramabad (IR); Fatemeh Yazdankhah, Khorramabad (IR); Kolsoum Nouriasl, Khorramabad (IR); Somayeh Hajipour, Khoramabad (IR)

(72) Inventors: Alireza Ghiasvand, Khorramabad (IR); Fatemeh Yazdankhah, Khorramabad (IR); Kolsoum Nouriasl, Khorramabad (IR); Somayeh Hajipour, Khoramabad (IR)

(*) Notice: Subject to any disclaimer, the term of this patent is extended or adjusted under 35 U.S.C. 154(b) by 157 days.

(21) Appl. No.: 15/484,133

(22) Filed: Apr. 11, 2017

(65) Prior Publication Data

US 2017/0282156 A1    Oct. 5, 2017

(30) Foreign Application Priority Data

Apr. 9, 2016 (IR) .................... 13955014000300053

(51) Int. Cl.
| | |
|---|---|
| *B01J 20/28* | (2006.01) |
| *B01J 20/22* | (2006.01) |
| *B01J 20/32* | (2006.01) |
| *C25B 11/04* | (2006.01) |
| *B82Y 30/00* | (2011.01) |

(52) U.S. Cl.
CPC ........ *B01J 20/28007* (2013.01); *B01J 20/22* (2013.01); *B01J 20/28023* (2013.01); *B01J 20/3236* (2013.01); *B82Y 30/00* (2013.01); *C25B 11/0473* (2013.01); *C01B 2202/06* (2013.01)

(58) Field of Classification Search
CPC .......................... B01J 20/28007; B01J 20/22; B01J 20/28023; B01J 20/3236; B82Y 30/00; C25B 11/0473; C01B 2202/06
See application file for complete search history.

(56) References Cited

U.S. PATENT DOCUMENTS

| | | | |
|---|---|---|---|
| 2014/0011112 A1 | 1/2014 | Guo et al. | |
| 2014/0011669 A1 | 1/2014 | Guo et al. | |
| 2014/0011671 A1 | 1/2014 | Guo et al. | |
| 2014/0103558 A1 | 4/2014 | Kim et al. | |
| 2015/0273737 A1* | 10/2015 | Chen ...................... | B29C 41/22 428/336 |
| 2017/0184554 A1* | 6/2017 | Ghiasvand ........... | G01N 30/482 |
| 2017/0332928 A1* | 11/2017 | Atashbar .............. | A61B 5/0408 |
| 2018/0261401 A1* | 9/2018 | Vilatela ................ | H01G 11/36 |

\* cited by examiner

*Primary Examiner* — Nahida Sultana

(74) *Attorney, Agent, or Firm* — NovoTechIP International PLLC

(57) ABSTRACT

A stainless steel wire may be platinized using electrophoretic deposition (EPD) method and then may be coated by polyaniline/multiwalled carbon nanotube (PANI/MWCNT) nanocomposite by electrochemical polymerization (EP). The resulting fiber may be used for headspace solid-phase microextraction (HS-SPME) of residual solvents (benzene, toluene, ethylbenzene and xylene, BTEX) in commercial pharmaceutical drugs, followed by gas chromatography-flame ionization detection (GC-FID).

15 Claims, 6 Drawing Sheets

US 10,258,963 B2

EXTRACTION AND DETERMINATION OF RESIDUAL ORGANIC SOLVENTS IN PHARMACEUTICAL PRODUCTS BY SPME METHOD USING A NEW NANOCOMPOSITE FIBER

CROSS REFERENCE TO RELATED APPLICATION

This application claims the benefit of priority to an Iran patent application having a serial number 139550140003000539 filed on Apr. 9, 2016, which is incorporated by reference herein in its entirety.

TECHNICAL FIELD

The present disclosure relates generally to a method for determination of residual solvents in pharmaceutical and, in particular, relates to a method to synthesize a fiber by an electrochemical polymerization (EP).

BACKGROUND

Organic residuals in pharmaceutical products, which may be the solvent or byproducts of chemical synthesis or separation processes, have caused a great deal of concern. Developing fast, reliable and cost effective separation techniques for the organic residuals is therefore crucial. In recent years, Solid Phase Microextraction (SPME) techniques have attracted attention due to their simplicity and sensitivity. However, there are some disadvantages associated with the SPME. The disadvantages may include fiber delicacy, costly commercial fibers, and restricted sorption capacity. Hence, there is a need to prepare a more reliable, less expensive and less fragile SPME fiber to overcome the drawback of the available commercial fibers.

SUMMARY

In one general aspect, the instant application describes a method to synthesize polyaniline/multiwall carbon nanotube (PANI/MWCNT) nanocomposite. The method includes decanting MWCNT and aniline into an electrolyte solution to prepare a PANI/MWCNT nanocomposite sorbent; coating a stainless-steel wire with platinum to create a substrate for coating the PANI/MWCNT nanocomposite sorbent thereon; inserting the platinum coated stainless-steel wire into the electrolyte solution; and coating the platinum coated stainless-steel wire with the PANI/MWCNT nanocomposite sorbent by applying a voltage to the platinum coated stainless-steel wire.

The above general aspect may include one or more of the following features. The platinum coated stainless-steel wire inserted into the electrolyte solution may be used as an anode. The method may further include inserting another wire into the electrolyte solution as a cathode. Coating the platinum coated stainless-steel wire with the PANI/MW-CNT nanocomposite sorbent may include coating the platinum stainless-steel wire with the PANI-MWCNT nanocomposite sorbent by applying the voltage between the anode and the cathode to create a fiber.

Decanting MWCNT and aniline into the electrolyte solution may include decanting 0.1 g MWCNT and 0.05 M aniline into 30 mL of 0.05 M SDS electrolyte solution inside a 40 mL SPME vial with an aluminum cap to prepare the nanocomposite sorbent. The aniline may be kept in darkness and distilled prior to reaction. The applied voltage between anode and cathode may be 1.4 V for 300 seconds. The fiber may be coupled to Gas Chromatography-Flame Ionization Detector (GC-FID).

Coating the platinum coated stainless-steel wire with the PANI/MWCNT nanocomposite sorbent includes coating the platinum coated stainless-steel wire with the PANI/MW-CNT nanocomposite sorbent while the anode is rotating at 200 rpm.

Coating the stainless-steel wire with platinum includes coating the stainless-steel wire with platinum via a two-electrode technique in an electrolyte solution comprising 0.42 g $K_2PtCl_6$ and 0.2 g $H_3BO_3$ in 20 mL water. The two-electrode technique may include using the stainless-steel wire as an anode and another stainless steel wire as a cathode in a platinum solution. The platinum solution may be ultra-sonicated for 10 min and added in a 25-mL container, which may be used as an electrochemical cell in a water bath at 80° C. A 1 mA current may flow between the anode and cathode for 5 seconds. The anode and cathode may be at 2 cm distance from each other.

The method may further include heat-treating the PANI/MWCNT for approximately 1 hour at 200° C. The sorbent may be configured for microextraction of the organic solvents of Benzene-Toluene-Ethyl Benzene-Xylene (BTEX) in penicillin.

BRIEF DESCRIPTION OF THE DRAWINGS

Features of the subject technology are set forth in the appended claims. However, for purpose of explanation, several implementations of the subject technology are set forth in the following figure.

DETAILED DESCRIPTION

In the following detailed description, various examples are presented to provide a thorough understanding of inventive concepts, and various aspects thereof that are set forth by this disclosure. However, upon reading the present disclosure, it may become apparent to persons of skill that various inventive concepts and aspects thereof may be practiced without one or more details shown in the examples. In other instances, well known procedures, operations and materials have been described at a relatively high-level, without detail, to avoid unnecessarily obscuring description of inventive concepts and aspects thereof The instant application describes a method to synthesize polyaniline/multiwall carbon nanotube (PANI/MWCNT) nanocomposite configured for sampling and deliver analyte e.g. complicated particulate matters to an analytical device e.g. gas chromatograph. The nanocomposite sorbent of the present application may be used to extract the organic compounds of Benzene-Toluene-Ethyl Benzene-Xylene (BTEX) in penicillin. The results confirm the ability of the nanocomposite sorbent of the present application in extracting volatile organic compounds (VOCs) from pharmaceutical products.

Figure 1:
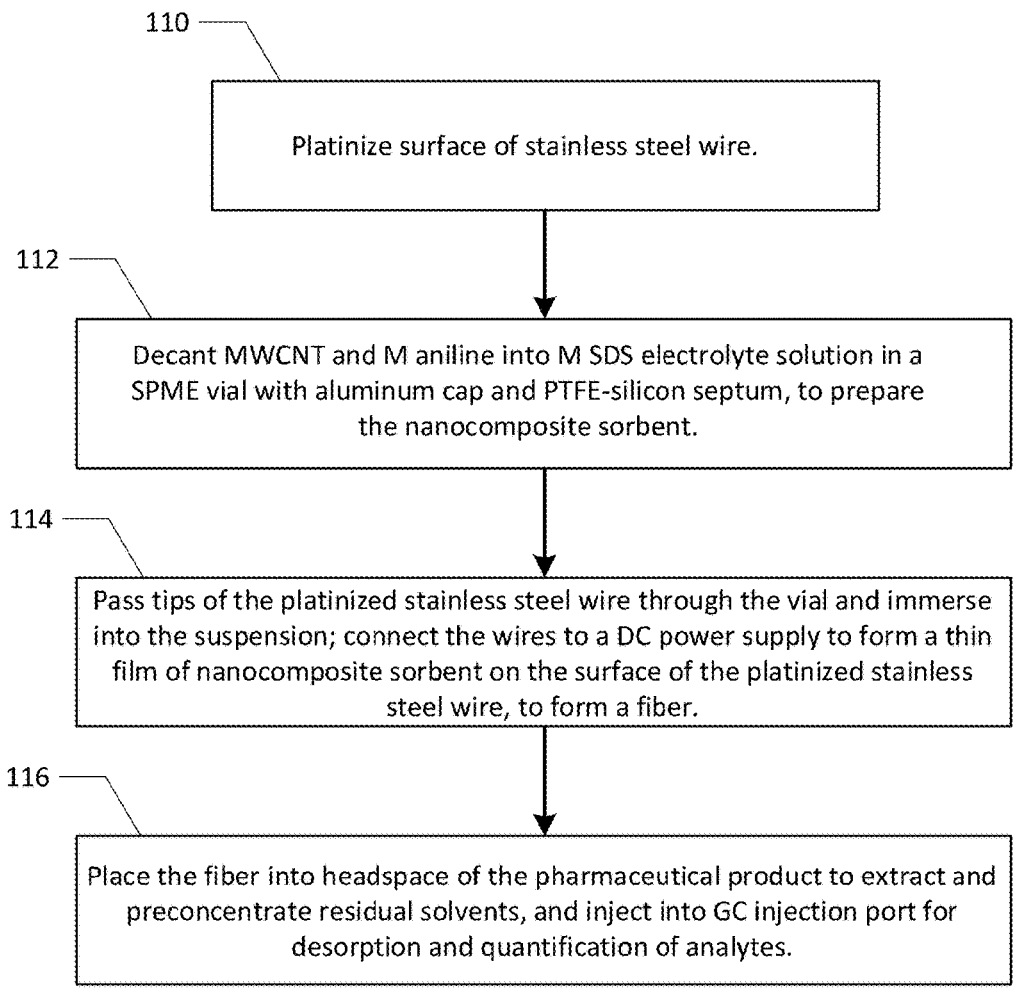
FIG. 1 illustrates an exemplary flow chart of the entire processes including steps of synthesis of the platinized fiber coated with synthesize polyaniline/multiwall carbon nanotube (PANI/MWCNT) nanocomposites, preparation of fiber, extraction and determination of analytes.

FIG. 1 illustrates an exemplary flow chart 100 of the entire processes including steps of synthesis of the platinized fiber coated with synthesize polyaniline/multiwall carbon nanotube (PANI/MWCNT) nanocomposites, preparation of fiber, extraction and determination of analytes.

The step of synthesis of the PANI/MWCNT nanocomposite sorbent may include three steps of: 1) treatment of a substrate (Step 110), 2) synthesis of the nanosorbent (Step 112), and 3) precipitating the nanosorbent on the substrate (Step 114). In the first step 110, a stainless-steel wire may be used as the substrate. The substrate may have high surface ratio, high porosity, high mechanical resistivity, high chemical resistivity and high adhesion properties. The substrate may further be resistive against chemical and mechanical stresses. To achieve the desired properties, the surface of the stainless-steel wire may be platinized. The stainless-steel wire may be platinized using a electrophoretic deposition (EPD) method.

In one specific example, a 4 cm long stainless-steel wire may be rinsed with distilled water twice. After drying at room temperature, the stainless-steel wire may be heat-treated in a vacuum furnace at 1100° C. for 35 min. The heat-treatment may facilitate the coating process. Upon cooling down to room temperature, the stainless-steel wire may be placed in a methanol container for a short period of time. Subsequently, the stainless-steel wire may be polished and then immersed in a solution for a few seconds. The solution may be contained 20 mL $HClO_4$ (69%) and ethanol in water (30%). The stainless-steel wire may then be immediately rinsed with distilled water twice.

The stainless-steel wire may serve as an anode and another normal stainless steel wire as the cathode in a platinum solution. The platinum solution may contain 0.42 g $K_2PtCl_6$ and 0.2 g $H_3BO_3$ in 20 mL water. The platinum solution may be ultra-sonicated for 10 min and added in a 25-mL container, which may be used as an electrochemical cell in a water bath at 80° C. The anode may be rotated at 200 rpm. A 1 mA current may flow between the anode and cathode for 5 seconds. The anode and cathode may be at 2 cm distance from each other. To achieve desired porosity, the electrochemical process may repeat 3 times and the anode may be rinsed with distilled water twice.

In the second step 112, MWCNT and M aniline may be decanted into M SDS electrolyte solution, inside a SPME vial with aluminum cap and PTFE-silicon septum to prepare the nanocomposite sorbent. In one specific example, 0.1 g MWCNT and 0.05 M aniline may be decanted into 30 mL of 0.05 M SDS electrolyte solution, inside a 40 mL SPME vial with aluminum cap and PTFE-silicon septum to prepare the nanocomposite sorbent. The nanocomposite sorbent may be the PANI/MWCNT nanocomposite sorbent. In addition, the cap of SPME vial may be kept closed and the mixture dispersed by means of an ultrasonicator. The platinum-coated stainless-steel wire of the first step 110 and the PANI/MWCNT nanocomposite sorbent of the second step 112 may be transferred to the third step 114.

In the third step 114, the tips of a platinized and a normal stainless steel wires may be passed through the opening of the vial and immersed into the suspension. Meanwhile, the wires may be connected to a DC power supply (1.4 V) for 15 min. The normal wire may be the counter electrode and platinized stainless steel wire may be the working electrode. During EPD process, the suspension may also be continuously stirred. Next, the platinized stainless steel wire may be removed from the vial.

In order to ascertain removal of pollution and remaining monomers, the platinized stainless steel wire may be washed with water and methanol several times. The EPD process may be repeated 3 times to achieve the desired thickness of the PANI/MWCNT film on the platinized stainless steel wire to form a SPME fiber. The resulting fiber may be placed into Gas Chromatography (GC) injection port for 2 h, at 250° C. for conditioning.

Figure 2:
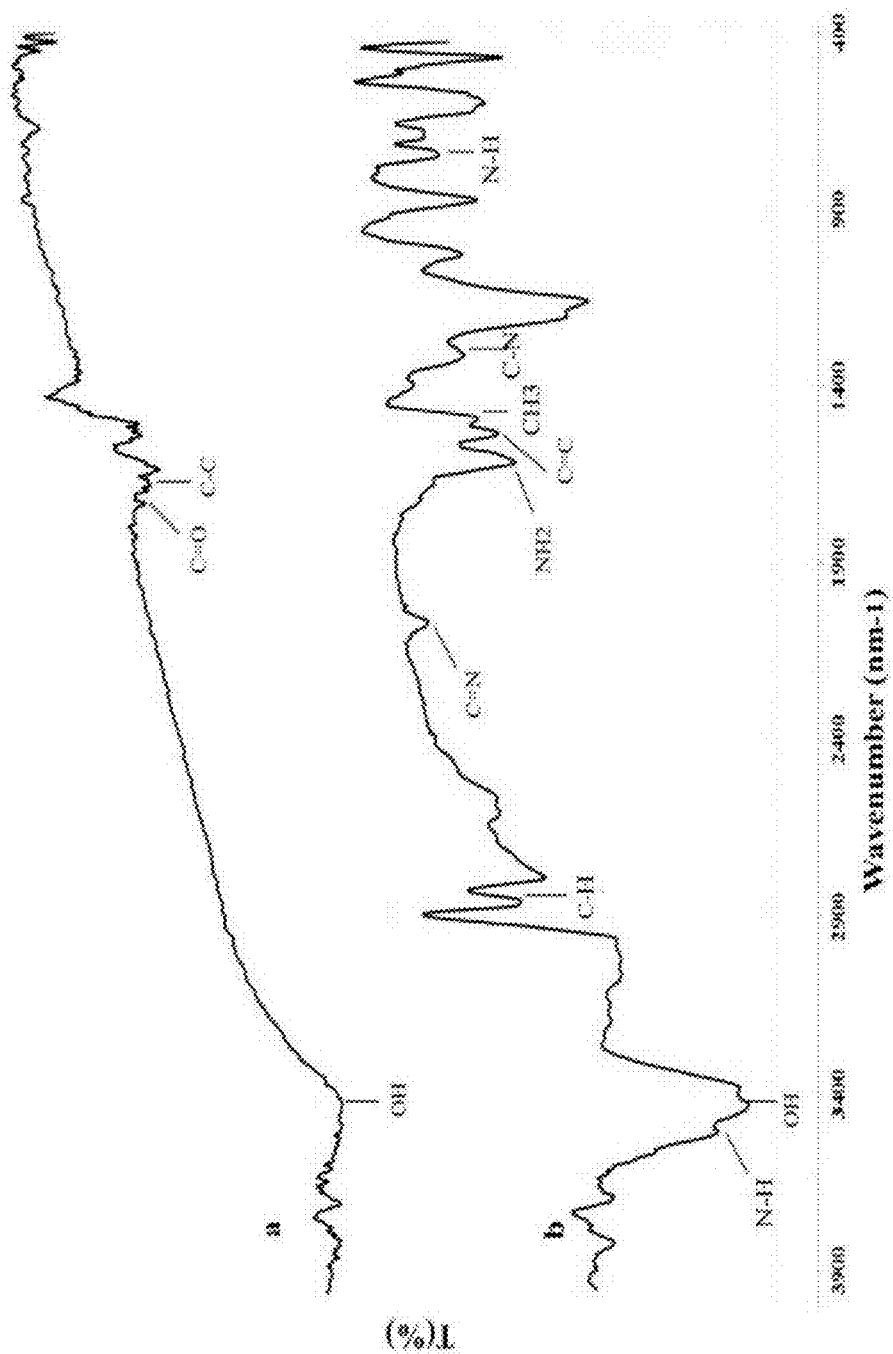
FIG. 2 illustrates Fourier transform infrared spectroscopy (FT-IR) of the PANI/MWCNT nanocomposite sorbent according to an implementation of the present application.
Figure 3:
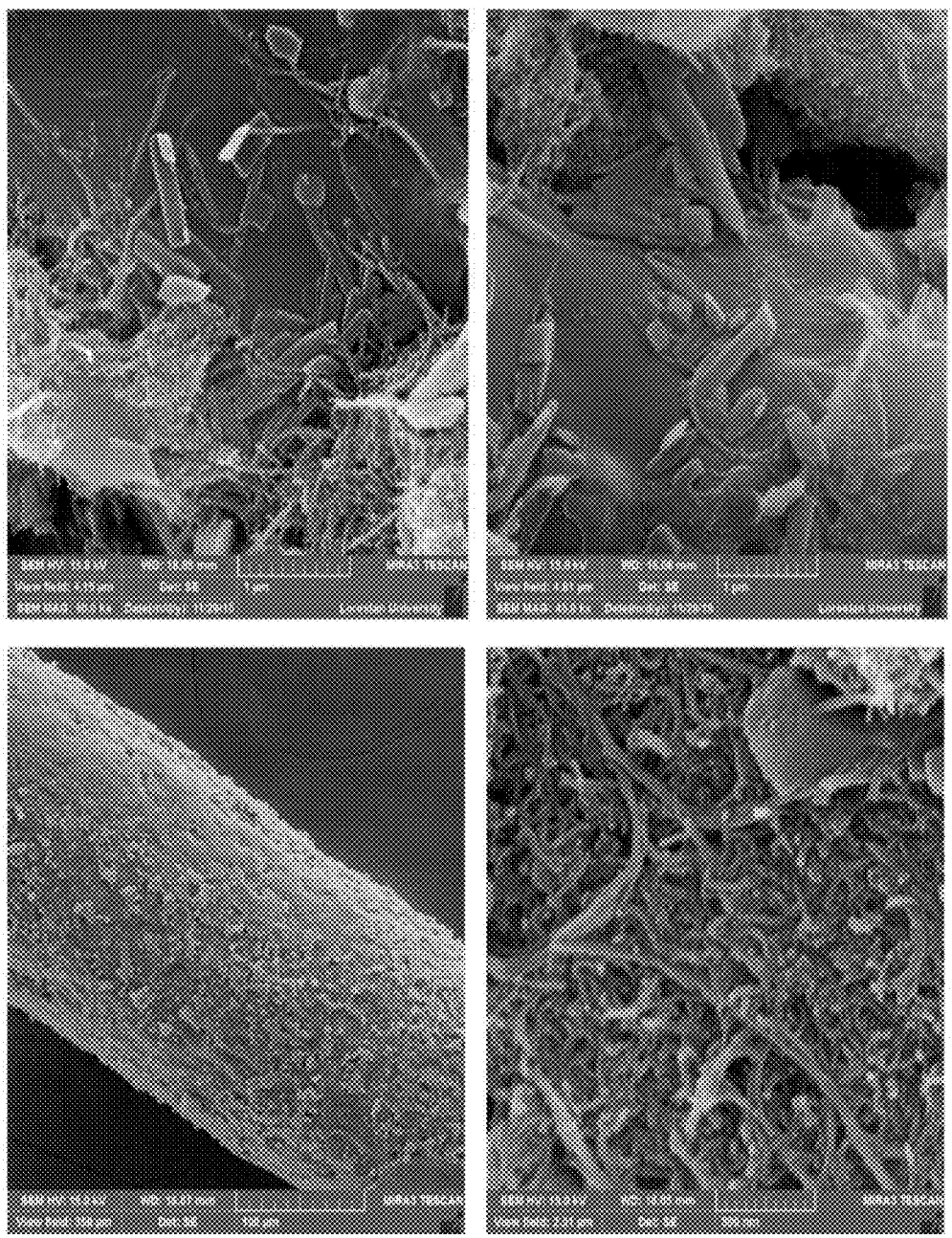
FIG. 3 illustrates SEM images of the PANI/MWCNT nanocomposite sorbent.

FIG. 2 illustrates Fourier transform infrared spectroscopy (FT-IR) of the PANI/MWCNT nanocomposite sorbent according to an implementation of the present application. FIG. 3 illustrates SEM images of the PANI/MWCNT nanocomposite sorbent.

Figure 4:
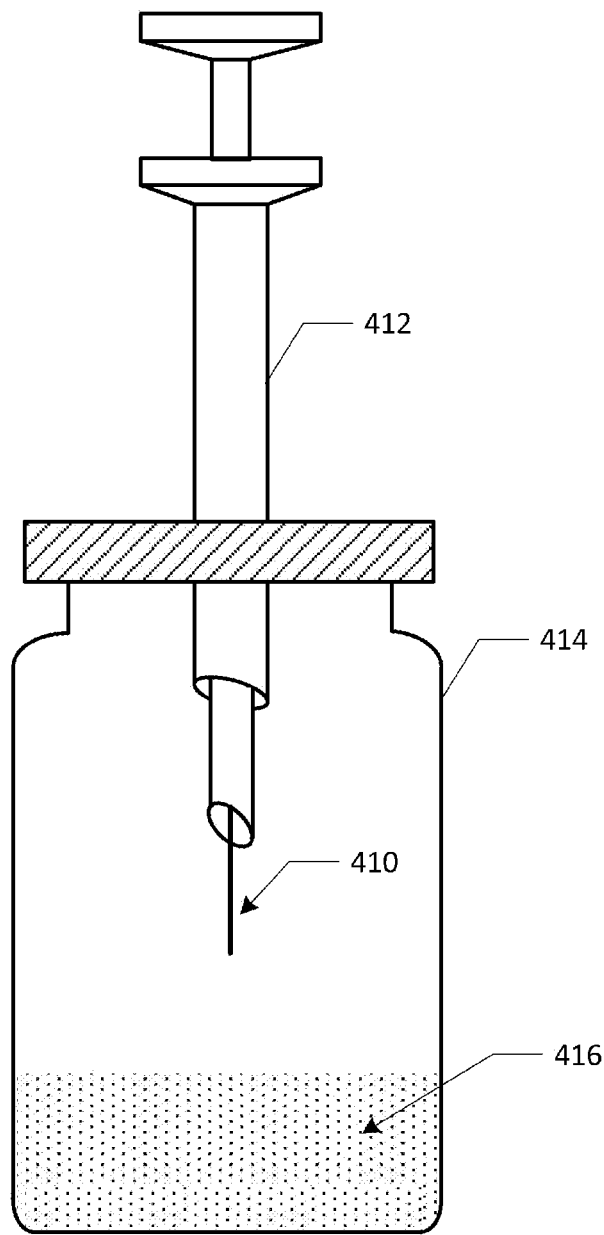
FIG. 4 depicts a schematic of an implementation of a nanocomposite sorbent of the present application used for microextraction of the organic solvents of Benzene-Toluene-Ethyl Benzene-Xylene (BTEX) in penicillin.

To provide the reader with greater clarity, FIG. 4 depicts a schematic of an implementation of a nanocomposite sorbent of the present application is used for microextraction of the organic solvents of Benzene-Toluene-Ethyl Benzene-Xylene (BTEX) in penicillin. In this case, the extraction temperature is 30° C., extraction time 15 minute, desorption temperature 250° C., and desorption time is 2 min. A syringe 412 including a PANI/MWCN T-coated stainless steel wire 410 may be inserted into an extraction vial 414. A sample matrix 416 may be disposed within the extraction vial 414.

Figure 5:
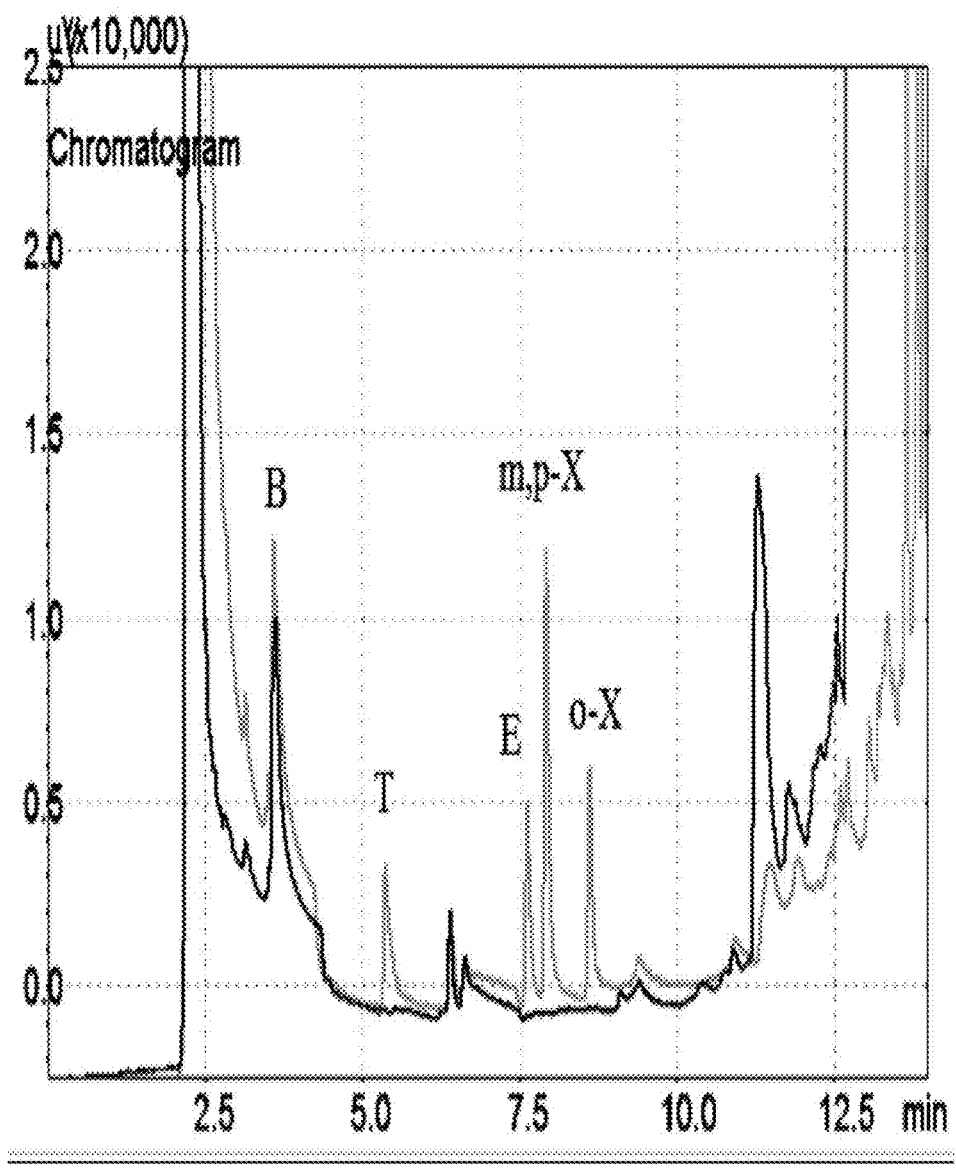
FIG. 5 illustrates the chromatogram of the extracted BTEX by PANI/MWCNT from a commercial penicillin bottle.
Figure 6:
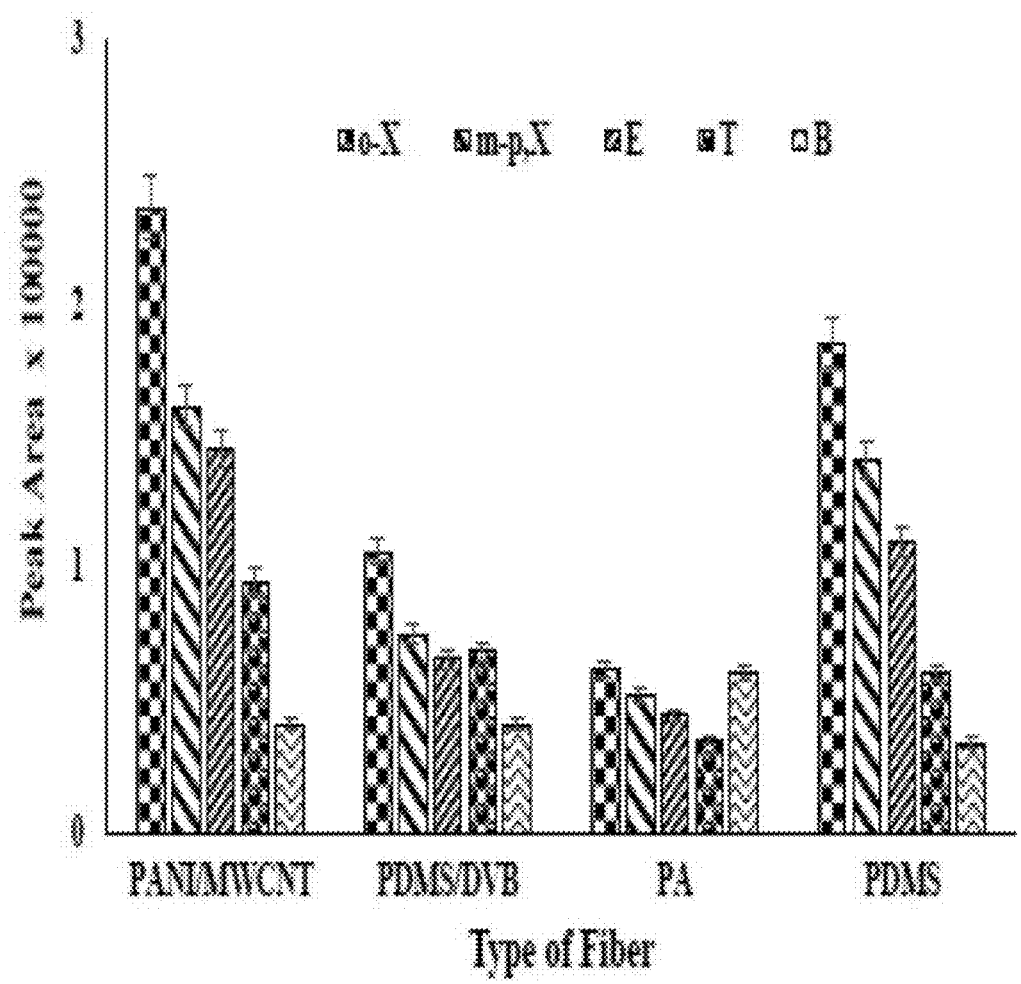
FIG. 6 compares the extraction efficiency of the PANI/MWCNT nanocomposite sorbent of the present application with commercial sorbents.

The PANI/MWCNT-coated stainless steel wire may be coupled to an analytical device e.g. GC. The gas chromatogram of the extracted BTEX by PANI/MWCNT is illustrated in FIG. 5. FIG. 6 also compares the PANI/MWCNT nanocomposite sorbent of the present application with commercial sorbents.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

What is claimed is:

1. A method to synthesize polyaniline/multiwall carbon nanotube (PANI/MWCNT) nanocomposite comprising:
   decanting multiwall carbon nanotube (MWCNT) and aniline into an electrolyte solution to prepare a polyaniline/multiwall carbon nanotube (PANI/MWCNT) nanocomposite sorbent;
   coating a stainless-steel wire with platinum to create a substrate for coating the PANI/MWCNT nanocomposite sorbent thereon;
   inserting the platinum coated stainless-steel wire into the electrolyte solution; and
   coating the platinum coated stainless-steel wire with the PANI/MWCNT nanocomposite sorbent by applying a voltage to the platinum coated stainless-steel wire.

2. The method of claim 1, wherein the platinum coated stainless-steel wire inserted into the electrolyte solution is used as an anode, the method further comprising inserting another wire into the electrolyte solution as a cathode.

3. The method of claim 2, wherein coating the platinum coated stainless-steel wire with the nanocomposite sorbent includes coating the platinum stainless-steel wire with the PANI-MWCNT nanocomposite sorbent by applying the voltage between the anode and the cathode to create a coating on a fiber's surface.

4. The method of claim 3, wherein decanting MWCNT and aniline into the electrolyte solution includes decanting 0.1 g MWCNT and 0.05 M aniline into 30 mL of 0.05 M SDS electrolyte solution inside a 40 mL SPME vial with an aluminum cap (with silicon/PTFE septum) to prepare the nanocomposite sorbent.

5. The method of claim 4, wherein the aniline is kept in darkness and distilled prior to reaction.

6. The method of claim 3, wherein the applied voltage between anode and cathode is 1.4 V for 5 miuntes.

7. The method of claim 3, wherein the fiber is coupled to gas chromatography-flame ionization detector (GC-FID).

8. The method of claim 1, wherein coating the platinum coated stainless-steel wire with the PANI/MWCNT nanocomposite sorbent includes coating the platinum coated stainless-steel wire with the PANI/MWCNT nanocomposite sorbent while the anode is rotating at 200 rpm.

9. The method of claim 1, wherein coating the stainless-steel wire with platinum includes coating the stainless-steel wire with platinum via a two-electrode technique in an electrolyte solution comprising 0.42 g $K_2PtCl_6$ and 0.2 g $H_3BO_3$ in 20 mL water.

10. The method of claim 9, wherein the two-electrode technique includes using the stainless-steel wire as an anode and another stainless-steel wire as a cathode in a platinum solution.

11. The method of claim 10, wherein the platinum solution is ultrasonicated for 10 min and added in a 25-mL container, which is used as an electrochemical cell in a water bath at 80° C.

12. The method of claim 11, wherein a 1 mA current flows between the anode and cathode for 5 seconds.

13. The method of claim 12, wherein the anode and cathode are at 2 cm distance from each other.

14. The method of claim 1, further comprising heat-treating the PANI/MWCNT for approximately 1 hour at 200° C.

15. The method of claim 1, wherein the sorbent is configured for microextraction of the organic solvents of Benzene-Toluene-Ethyl Benzene-Xylene (BTEX) in commercial penicillin vials.

* * * * *